United States Patent [19]
Leva et al.

[11] 4,075,298
[45] Feb. 21, 1978

[54] CONTACT TOWERS WITH LEAK-PROOF SUPPORT OF IMPROVED PLATE SUBASSEMBLY

[76] Inventors: Max Leva; Joseph L. Leva, both of One Hodgson Ave., Pittsburgh, Pa.

[21] Appl. No.: 673,880

[22] Filed: Apr. 5, 1976

Related U.S. Application Data

[63] Continuation-in-part of Ser. No. 589,906, June 24, 1975, Pat. No. 3,997,633.

[51] Int. Cl.² ............................................. B01D 3/22
[52] U.S. Cl. ................................. 261/114 TC; 52/246
[58] Field of Search ...................... 261/97, 113, 114 R, 261/114 TC; 52/246

[56] References Cited

U.S. PATENT DOCUMENTS

| | | | |
|---|---|---|---|
| 1,749,266 | 3/1930 | Sontag | 261/113 |
| 2,341,091 | 2/1944 | Glitsch | 261/114 R |
| 2,582,826 | 1/1952 | Glitsch | 261/114 TC |
| 2,611,457 | 9/1952 | Glitsch | 261/114 TC |
| 2,860,860 | 11/1958 | Wilson | 261/113 |
| 3,367,638 | 2/1968 | Leva | 261/113 |
| 3,446,489 | 5/1969 | Leva | 261/113 |

FOREIGN PATENT DOCUMENTS

| | | | |
|---|---|---|---|
| 1,215,606 | 12/1970 | United Kingdom | 261/97 |
| 961,442 | 6/1964 | United Kingdom | 261/97 |

*Primary Examiner*—Tim R. Miles
*Assistant Examiner*—Gregory N. Clements
*Attorney, Agent, or Firm*—Smith and Carothers

[57] ABSTRACT

A gas-liquid contact tower comprises a tower shell and a plurality of superimposed generally horizontal contact plates mounted in vertically spaced relation within the tower shell, with the plates being grouped into at least one subassembly thereof. A supporting and sealing arrangement is provided for removably supporting said plate subassembly within the tower shell and for preventing any of the contact liquid from bypassing the plate subassembly. The supporting and sealing arrangement includes a first annular component permanently secured and sealed to adjacent inner surfaces of the tower shell, and a second annular component joined circumferentially to the plate subassembly and sealed detachably and circumferentially to the first supporting and sealing component. An annular gasket arrangement is inserted generally between the first and second components of the supporting and sealing arrangement and is circumferentially loaded by a loading arrangement mounted on at least one of the components. Other features of the invention include novel arrangements for draining liquid accumulating on the supporting and sealing arrangement, for shielding the supporting and sealing arrangement against the accumulation of liquid and for leveling the plate subassembly or for aligning the same with the supporting and sealing arrangement after the subassembly is placed within the tower.

A contact plate subassembly for use in a contact tower comprises a top contact plate and a bottom contact plate, together with a number of intermediate contact plates. A plurality of spacing and sealing rings alternate with the plates. The top or bottom contact plate of the subassembly has a peripheral extension or flange for mounting purposes, and a stabilizing ring is secured to the mounting extension. Alternatively a flanged baffle can be joined to the plate subassembly for mounting purposes.

14 Claims, 12 Drawing Figures

CONTACT TOWERS WITH LEAK-PROOF SUPPORT OF IMPROVED PLATE SUBASSEMBLY

RELATED APPLICATIONS

The present application is a continuation-in-part of our copending application for Contact Towers With Leak-Proof Support of Improved Plate Subassembly, Ser. No. 589,906 filed June 24, 1975, now U.S. Pat. No. 3,997,633.

The present application is similar in certain respects to our copending application for Preventing Wall Leakage In Contact Towers, Ser. No. 589,875 filed June 24, 1975.

The present invention relates to multiple-plate, vapor or gas-liquid contact towers of the type wherein a large number of contacting plates are arranged in spaced subassemblies of closely spaced plates. Contact towers of this general configuration are described in U.S. Pat. Nos. 3,075,752 and 3,367,638 granted to Dr. Max Leva and also in his copending application Ser. No. 367,133 for Gas-Liquid Contact Apparatus, filed June 5, 1973 now U.S. Pat. No. 3,928,513.

Although the invention is described primarily with reference to contacting vapor-liquid phases, the invention is generally applicable to towers handling gas-liquid phases and the like. The term "gas-liquid" when employed herein is therefore inclusive of the various "vapor-liquid" relationships applicable to contact towers.

In a typical, but non-limiting, application of contact towers, a feed stock of closely boiling liquids is introduced to the tower, often at a location adjacent the midpoint of its overall height. The feed stock can consist, for example, of ortho and para variants of numerous aromatic liquids. Other closely boiling miscible liquids in various proportions can also be introduced. Typically but not necessarily the feed stock of a distillation contact tower may consist of a mixture of miscible liquids having boiling points within one or two degrees Fahrenheit. (In other contact towers applications, immiscible liquid, vapor-liquid or gas-liquid feed stocks can be handled). Upon introduction to the contact tower, the higher boiling liquid descends to the bottom of the tower through numerous contact plates, while the lower boiling liquid vaporizes and, passing likewise through numerous contact plates, ascends to the top of the tower. A condenser-reflux arrangement supplies the liquid phase in the upper region of the tower, and a reboiler system supplies the vapor or gaseous phase in the lower reaches of the contact tower.

In high purity operations, a lower-boiling top product or distillate can be extracted from the top of the tower having only 20ppm or less of the higher-boiling component as a contaminant. Conversely the higher-boiling bottom product may contain only 20ppm or less of the lower-boiling component as contaminant.

A very serious problem arises in the operation of contact towers in that relatively small amount of liquid, either from splashing or condensation at the tower walls, frequently descend along the inner wall surfaces of the enclosing vessel and thus bypass the many contact plates in the lower regions of the tower. This wall leakage can descend directly to the bottom of the contact tower where it will severely contaminate the bottom product. In high purity operations, it will be evident that a very minor amount of leakage at the inner wall surfaces of the vessel can contaminate the bottom product to an extent far beyond the aforementioned 20 ppm or other specification of trace contamination.

Unfortunately the contact plates cannot be peripherally are permanently sealed to the inner wall surfaces of the contact tower as removability is prerequisite to cleaning and maintenance of the tower. Moreover, upon heating of the contact tower the shell or vessel walls and the perimetric edges of the plates expand unequally, which would disrupt any such permanent sealing.

It has been proposed to form bundles of contact plates joined by the tie-rods, with the plates separated by peripheral sealing rings. Each of the plate bundles are then sealed to the inner wall surfaces of the tower vessel by means of a large-diameter, resilient or elastic O-ring (contact towers typically are from one to two feet to ten or fifteen or more feet in diameter). The thermal cycling of the contact tower, however, causes the O-ring or other sealing ring or packing to lose much of its elasticity or resiliency, with the result that the aforesaid wall leakage develops within a comparatively short time. Many feed stocks employed in contacting towers cause the aforementioned O-rings or other packing arrangements to become relatively brittle which accelerates the development of wall leakage.

Differences in thermal expansions between the O-ring housing, the O-ring itself and the vessel walls likewise accelerate development of wall leakage. In many cases heating or thermal cycling of the contact tower causes distortion of the walls of the contact vessel to accentuate out-of-round tolerances to the extent that a leakage path can be formed though the O-ring material has not entirely lost is elasticity or resiliency.

In those contact towers having spaced subassemblies of contact plates the wall leakage problem is aggravated by condensation of the vapor phase on the relatively cooler inner wall surfaces of the vessel between the plate subassemblies.

The thermal cycling of the contact tower together with attack by feed stock chemicals, causes the O-rings to shrink and harden over longer or shorter periods of time depending on the particular feed stock and the material of the O-rings. In consequence, the O-rings can contact with the adjacent vessel walls at one or more locations about the periphery of the O-rings, with resultant wall leakage.

Another serious problem respecting contact towers is the proper support of the many contacting plates without the use of heavily constructed supporting hardware and other structural complexities, while providing quick and easy removability for maintenance purposes. At the same time the plates must be positively located within the contact tower, during its operation, in avoidance of any lateral, vertical, or circumferential movements, any of which would interfere with the proper plate-to-plate spacings and the proper orientation of their flow apertures with respect to apertures of adjacent plates.

In the past subassemblies of contact plates have been provided with a relatively heavy bottom supporting plate or foraminous grid which rested on lugs welded to the inner wall surfaces of the tower vessel. The heavy bottom plates added considerably to the weight of the plate subassemblies to make installation and removal thereof more difficult. In addition to providing nonuniform support for the plate subassemblies, the welded lugs interfered with removal of the subassemblies for maintenance purposes. The plate subassemblies usually were equipped with sealing O-rings or other packing arrangement extending peripherally of the top portion of each plate subassembly to further complicate the structure of the plate subassembly. In addition to the disadvantage of structural complexity, the O-ring sealing arrangement allowed the development of bypassing wall leakage, as described below.

The rather large number of contact plates has been assembled in the past through the use of rather heavy guide rods extending continuously through a relatively large number of the plate subassemblies. In addition to increased manufacturing and assembly difficulties introduced by the use of guide rods, incorporation of the guide rods introduced potential bypassing leakage paths for the liquid phase.

Another problem in the construction of contacting towers has been the required reinforcement of the vessel itself. In the past this has been accomplished more less by brute force techniques, either by providing a vessel with undue wall thickness or by the use of external stiffening rings welded every six to ten feet along the overall height of the vessel. This problem is aggravated, of course, where the contact tower is operated at considerable wall loadings induced by large differential pressures with respect to ambient pressure.

Other problems encountered in the construction and operation of contact towers are concerned with the proper distribution of liquid radially over the plate subassembly (particularly the top plate thereof), either from the feed inlet or from the reflux return or from overlying plate subassemblies. Previously, non-uniform distribution has lowered contact efficiencies and has resulted in splashing of sensitive seals with resultant bypassing Another problem arises in the segment of contact towers from place to place, during which the towers are usually consigned to a horizontal position. When the towers are in transit, it is desirable to provide some arrangement for stabilizing the individual plate subassemblies against the possibility of lateral displacement within the tower.

The aforementioned problems and difficulties of the prior art are solved by our present invention which provides an unprovided contact tower and a unique subassembly of contact plates. A number of plate subassemblies can be positively mounted in spaced relation along the overall height of the contacting tower for positive and uniform support thereof while providing easy and quick removability. The structure of the plate subassembly has been considerably simplified by obviating the need for a heavily constructed bottom supporting plate or grid and for the aforementioned guide rods. The plate subassembly structure of the invention and the supporting and sealing means therefor also eliminates the need for the supporting lugs and O-ring seals of conventional contact tower constructions.

An arrangement for suspending and sealing one or more individual plate subassemblies at spaced locations within the contact tower is provided by the invention. Most importantly the suspending arrangement includes sealing means mounted in such fashion that the sealing material is relatively immune from attack by various components of the feed stock. The supporting and sealing arrangement for the plate subassemblies affords uniform peripheral support and positive location of each subassembly against any possibility of lateral, vertical or circumferential movements. The supporting and sealing arrangement involves employment of a number of permanently installed supporting rings or annuli which do not interfere with removal of the plate subassemblies and associated hardware. The positive location and retention of the plate subassemblies obviates the need of the aforementioned guide rods or other locating components. The mounting arrangement of the plate subassemblies also includes means for uniformly and positively loading the gasket material or other sealing means associated therewith and for minimizing the exposed area of the gasketing material. The supporting rings of our novel subassembly suspending arrangement also afford a pronounced stiffening characteristic for the contact vessel walls. The stiffening effect is enhanced owing to spacing of the supporting rings or annuli every two to five feet (for most applications). Accordingly the vessel walls can be made much thinner and the external stiffening rings of conventional contact towers can be completely eliminated. Owing to the close placement of the aforementioned supporting rings, the latter rings can be much more lightly constructed than the conventional external stiffening rings.

Although the top plate of our novel plate subassembly is somewhat heavier constructed than the remaining contact plates of the subassembly, the very heavy construction of the conventional bottom support plate (which is not a contact plate) of conventional subassemblies is not required owing to the continuous peripheral support afforded by our invention at the top plate of the subassembly. Again in contact to the conventional bottom support plate, our much thinner top support plate can serve additionally as liquid distributor, as is more clearly defined below.

In further accordance with our invention, our novel top supporting plate is unexpectedly provided with an arrangement for distributing and controlling the flow of the liquid phase to the remaining plate of each subassembly. Desirably the top supporting plates are provided with additional means for eliminating splashing of the liquid phase from the overlying plate assembly, or splashing of the feed stock liquid or the reflux liquid at that subassembly adjacent the feed or reflux inlet.

In further accordance with the invention, novel and unexpected means are provided for draining any liquid accumulated upon the suspending and sealing arrangements for the several plate subassemblies. In still another unexpected feature of the invention, a novel arrangement is incoporated into the supporting and sealing means for leveling a plate subassembly and/or for aligning the subassembly with components of the supporting and sealing arrangement.

As shown more clearly by the forthcoming detailed description of our improved contact tower, the improved subassembly and its leak-proof suspension arrangement considerably enhance the liquid-vapor or -gas contacting efficiency of the tower.

We attain these desirably ends by providing in a gasliquid contact tower the combination comprising a tower shell, a plurality of superimposed generally horizontal contact plates mounted in vertically spaced relation within said tower shell, said plates being grouped into at least one subassembly thereof, supporting and sealing means for removably supporting said plate subassembly within said tower shell and for preventing any of said contact liquid from bypassing said plate subassembly, said supporting and sealing means including a first annular component permanently secured and sealed to adjacent inner surfaces of said tower shell and a second annular component circumferentially joined to said plate subassembly and detachably and circumferentially sealed to said first component, and gasketing means for preventing passage of fluid between said components, said gasketing means being inserted generally between said components and circumferentially loaded by loading means mounted on at least one of said components.

We provide a similar contact tower combination wherein said supporting and sealing means include a number of suspending means mounted on said plate subassembly and having a number of outwardly extending members bearingly engaging said first annular component.

We provide a similar contact tower combination wherein said outwardly extending members bearingly and respectively engage jack screws mounted on said first component for aligning or leveling purposes.

We also desirably provide a gas-liquid contact tower comprising a tower shell, a plurality of superimposed generally horizontal contact plates within said tower shell, said plates being grouped into vertically spaced subassemblies thereof, supporting and sealing means for removably supporting each of said plate subassemblies within said tower shell and for preventing any of said contact liquid from bypassing said plate subassemblies, said supporting and sealing means including a supporting ring sealed to adjacent inner surfaces of said tower shell, a suspending ring detachably secured to said supporting ring and having an inner periphery projecting inwardly of said supporting ring, the associated plate subassembly having a plate at one end thereof projecting radially outwardly of said subassembly, the radial projection thereof being detachably secured to the inward peripheral projection of said suspending ring, and annular gasket means inserted between said supporting ring and said suspending ring and between said suspending ring and said radial plate projection, said gasketing means being uniformly loaded at detachable junctions between said supporting ring and said suspending ring and between said suspending ring and said radial subassembly projection.

We also desirably provide a similar contact tower wherein a stabilizing ring is secured to said radial projection on a side thereof opposite from said suspending ring.

We also desirably provide a similar contact tower wherein said supporting ring and said radial projection are on one side of said suspending ring, and said gasket means is a continuous annular gasket member substantially coextensive with said one suspending ring side.

We also desirably provide a similar contact tower wherein said supporting and sealing means include a plurality of said supporting rings and plate subassemblies spaced along the height of said tower shell, said supporting rings being of sufficiently heavy construction as to reinforce said tower shell against substantial wall loading.

We also desirably provide a similar contact tower wherein said radially projecting plate is located at the upper end of the associated each plate subassembly so that said plate subassembly is suspended from said supporting and sealing means.

We also desirably provide a contact plate subassembly for use in a contact tower, said subassembly comprising a top contact plate and a bottom contact plate, a number of intermediate contact plates, a plurality of spacing and sealing rings alternating with said plates, one of said top and said bottom contact plates having a peripherally radial extension for mounting purposes, and a stabilizing ring secured to said extension.

We are not aware of any patent or literature reference disclosing any of the novel arrangements pointed out above.

During the foregoing discussion, various objectives, features and advantages of the invention have been set forth. These and other objectives, features and advantages of the invention together with structural details thereof will be elaborated upon during the forthcoming description of certain presently preferred embodiments of the invention and presently preferred methods of practicing the same.

In the accompanying drawings we have shown certain presently preferred embodiments of the invention and have illustrated certain presently preferred methods of practicing the same wherein:

FIG. 7 is a partial, vertically sectioned view of a tower similar to that shown in FIG. 6, but illustrating a modification of the plate subassembly and associated components;

FIG. 7A is a fragmentary view of FIG. 7 showing a further modification of the plate assembly supporting means;

FIG. 8 is a similar view illustrating a laterally stabilizing arrangement for use with any of the aforementioned plate subassemblies; and, FIG. 8A is a partial, enlarged, vertically sectioned view of the contact tower shown in FIG. 8 but illustrating a modification of the subassembly stabilizing means.

Our invention is applicable to contact towers employed for a wide variety of vapor-liquid and gas-liquid applications. A typical but non-limiting application on the contact tower arrangement disclosed herein is described in our copending application (FIG. 1) entitled Preventing Wall Leakage In Contact Towers, Ser. No. 589,875, filed concurrently herewith.

Figure 1:
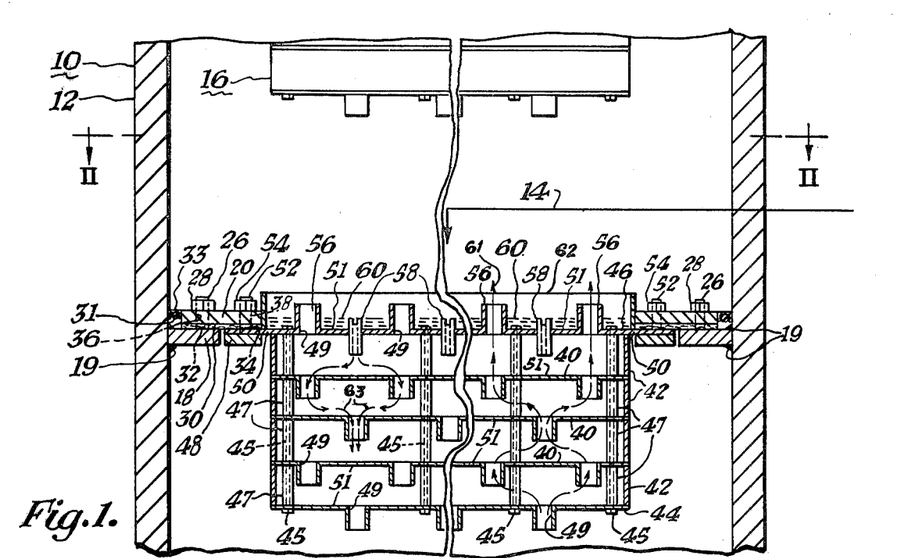
FIG. 1 is a partial, vertically sectioned view of one form of contacting tower arranged in accordance with our invention and illustrating our novel plate subassembly, together with novel means for supporting said sealing the subassembly within the tower vessel.
Figure 1A:
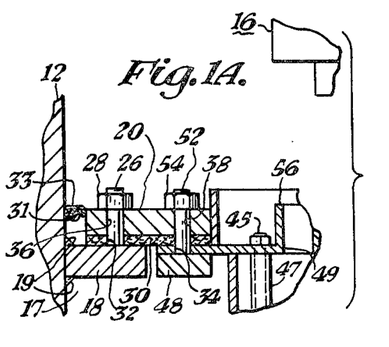
FIG. 1A is an enlarged view of a portion of the contact tower as shown in FIG. 1.
Figures 2, 4, 5:
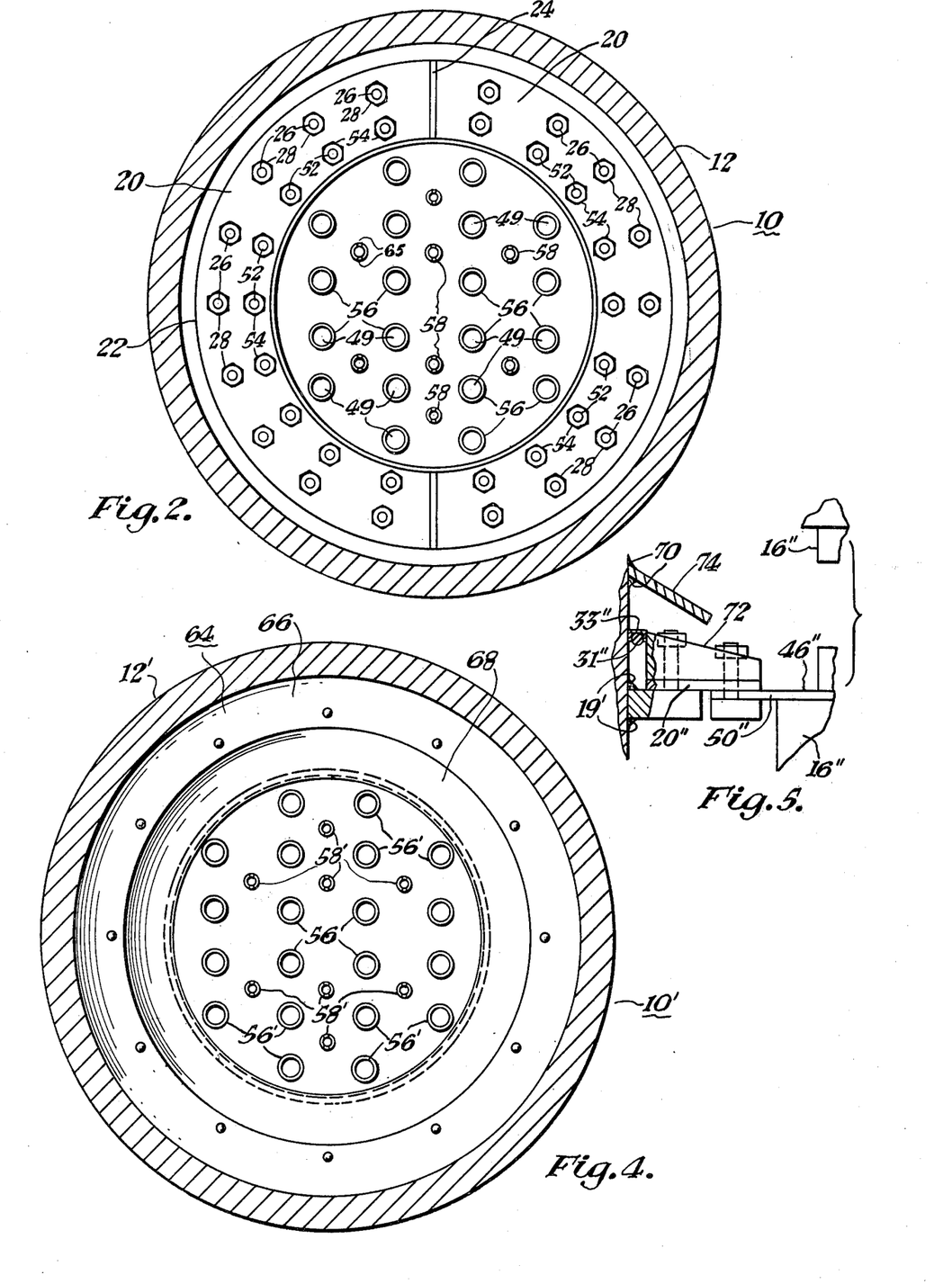
FIG. 2 is a cross-sectional view of the contact tower as shown in FIG. 1, and taken along reference line II—II thereof.
FIG. 4 is a cross-sectional view of the apparatus as shown in FIG. 3 and taken along reference line IV—IV thereof.
FIG. 5 is an enlarged, vertically sectioned partial view of another novel contact tower arrangement of the invention.

With reference now to FIGS. 1, 1A and 2 of the drawings, an exemplary contact tower 10 shown therein comprises a shell or vessel 12 into which a suitable feed stock can be introduced as denoted schematically by flow arrow 14. Where applicable the tower 10 can be of considerable height and can contain a large number of plate subassemblies, such as the subassemblies 16 spaced in tandem along the length or height of the shell 12. In other applications, the tower 10 can contain a single plate assembly.

Our invention includes, inter alia, a unique and surprising arrangement 17 for supporting and sealing the plate assemblies 16 within the shell 12, which at the same time eliminates the need for external reinforcing rings customarily employed on conventional tower shells. The supporting and sealing means include, generally, a first annular component peripherally and permanently secured and sealed to the inner wall surfaces of the tower shell 12, a cooperating second annular component joined to the associated plate subassembly and detachably joined to the first component, and a gasket loaded between the components.

Our novel supporting and sealing arrangement virtually eliminates the aforementioned wall leakage, with a minimum of hardware and gasketing materials. This is accomplished in accordance with one embodiment of our invention by welding a series of supporting rings or annuli 18 at intervals along the length of the shell 12. In typical applications the supporting rings 18 may vary between about two feet and about five feet in inter-ring spacing. In some applications, use of the supporting rings 18 can require the addition of about 4 to 6 inches to the diameter of the shell 12, which however is more than compensated by use of a thinner walled shell 12 and elimination of the aforementioned external reinforcing rings made possible by our invention. The supporting rings 18 provide more uniform reinforcement to the shell 12, as the supporting rings have a closer spacing than that customarily employed with the conventional external reinforcing rings. Thus, the supporting rings 18 can be relatively more lightly constructed (in comparison to external rings) but are still sufficiently heavily constructed to provide enhanced reinforcement for the shell 12 as well as enhanced support for the individual plate subassembly 16. In the latter function of the supporting rings 18, it is most noteworthy that the supporting rings afford a uniform, or continuously peripheral support for the respectively associated plate subassemblies 16.

Each of the supporting rings 18 is permanently and sealingly mounted by one or more seal-welds 19 to elimiate any possibility of bypassing wall leakage between the seal rings 18 and the adjacent wall surfaces of the shell 12.

Overlying each of the supporting rings 18 is a suspending ring 20 desirably supplied in two or more split ring parts 22 (FIG. 2) for ready removability. After installation, if desired, the split ring parts 22 can be temporarily welded at their junctions 24.

The suspending rings 20, during operation of the tower 10, are secured to the supporting rings 18 respectively by an outer row of detachable fasteners 26. The fasteners 26 can take a variety of forms such as bolts threaded into tapped apertures therefor in the supporting ring 18, or as illustrated, threaded stud fasteners 26 welded or otherwise secured to the supporting rings 18, to which the suspending rings 20 are secured by a series of machine nuts 28; or a combination of these. Through-bolts preferably are avoided, especially when handling highly mobile and unviscous liquids such as ether, which are capable of traveling along through-bolt threads and thereby bypassing the plate subassembly.

By permanently securing the securance studs 26 to the supporting rings 18, guides are thereby provided for assembly of the suspending rings 20 and the gasketing described below.

Underlying each of the suspending rings 20 are gasket means including a continuous gasket 30 fabricated from a suitable flexible or resilient material and provided with two circumferential arrays of bolt or stud apertures 32, 34. The gasket apertures are alignable with similarly disposed apertures 36, 38 in the suspending rings 20. The gaskets 30 and the suspending rings 20 can thereby be readily assembled onto the studs 26. After such assembly the gaskets 30 can be uniformly loaded by the suspending rings 20 by proper tightening of the machine nuts 28 or other fasteners. Any possibility of wall leakage passing between the suspending rings 20 and the supporting rings 18 is virtually eliminated. At the same time the suspending rings respectively afford a uniform and peripheral support for the plate subassemblies 16 which will now be described.

If desired the major portion of the wall leakage can be prevented from contacting the outer edge surfaces of each of the gaskets 30 by means of an O-ring or other suitable packing 31 and retaining ring 33 secured in sections to the adjacent suspending ring components 22.

In the arrangement of our invention as illustrated in FIGS. 1 and 2, each of the plate subassemblies comprises a number of contact plates 40 alternating with a plurality of peripheral sealing rings 42. The numbers of contact plates 40 and sealing rings 42 can be varied from that illustrated, as required by a specific application of the invention. A relatively lightly constructed bottom plate 44 replaces the usual heavily constructed bottom support grid of unknown subassemblies. Owing to its light construction the bottom plate 44 can also serve as a contact plate. In certain applications of the invention the bottom contact plate 44 can be substantially as thin as the intermediate contact plates 40.

The plate subassembly 16 is completed by a top supporting or suspending plate 46 which is desirably of heavier construction than the bottom plate 44. Accordingly the top plate 46 can also serve as liquid distributor and is, therefore, provided with novel liquid distributing and splash controlling arrangements in accordance with our invention and described below.

The assembly of contact plates 40, 44, 46 and peripheral sealing rings 42 can be held together by a series of tie rods 45 and spacing ferrules 47 after the manner, for example, disclosed in Dr. Leva's aforesaid copending application Ser. No. 589,875. Each of the contact plates 40, 44, 46 is provided with a series of flow apertures 49, which are desirably non-aligned with the flow apertures of adjacent plates for maximum contacting efficiency. The various plate apertures can be formed, shaped, and located after the manner of the last-mentioned copending application, and as shown in FIG. 2 of this application. The apertures 49 of each contat plate can be separated by portions 51 of plate material. At the apertures 49 of the intermediate plates 40 and the bottom plate 44 portions of the plate material are turned or extruded downwardly as evident from FIG. 1 of the drawing. This downward extension or extrusion of the plate material improves contacting efficiency by forcing a more intimate contact between the vapor-liquid phase or the gas-liquid phases, as the case may be. In contrast chimneys 56 are positioned around the top plate apertures 49 and extend upwardly.

The relatively light construction of the top supporting plate 46 primarily is made possible by use of a stabilizing ring 48 which can be respectively secured to overhanging peripheral or radially extending edge portions 50 of each top suspending plate 46. In contrast to the widely spaced point supports afforded by the supporting lugs of conventional contact towers, the stabilizing rings 48, in cooperation with the supporting rings 18, provide a continuous peripheral support for the associated subassemblies 16, in addition to other advantages described herein. As the stabilizing rings 48 do not project outwardly of the lateral edges of the plate subassemblies 16, the stabilizing rings 48 can be supplied in one piece and if desired can be permanently secured to the undersurfaces of the associated top suspending plates 46, for installation and removal with the subassemblies 16.

Alternatively the stabilizing rings 48 can be mounted on the upper surfaces of the top plate extensions 50, which in turn can be suspended from the top surfaces of the suspending rings 18. In this case, each gasket 30 would be replaced by two gaskets (not shown).

In any event each of the stabilizing rings 48 is provided with a series of tapped apertures, or as illustrated, with a similar number of threaded studs 52 permanently secured thereto for reception of suitable fasteners. The studs 52 extend through suitable aperatures therefor in the overhanging plate portions 50 and when the plate subassemblies 16 are installed in the tower 12, as shown in the drawings, the threaded studs 52 also extend through the aforementioned inner series of apertures 34, 38 in the associated gasket 30 and suspending ring 20 respectively. When thus assembled the gaskets 30 have sufficient differential diameter as to overlie the major proportion of the top plate extension 50 as well as the major proportion of the supporting rings 18. The gaskets 30 thereby can be loaded by machine nuts 54 or other fasteners when properly tightened on the studs 52. Securance of the machine nuts 54 or equivalent fastening devices also completes the suspension of the respectively associated plate subassemblies 16 within the tower shell 12. At the same time the doubly loaded gaskets 30 virtually prevent any possibility of wall leakage or of liquid splashings from bypassing any given one of the plate subassemblies 16.

In contrast to the intermediate and bottom plates 40, 44, the apertures 49 of each top plate 46 are provided with upwardly extending chimneys 56 secured to the top suspending plate 46 and extending about each of the apertures 49 thereof. The apertures 49 and chimneys 56 afford egress for vapor (arrows 61) flowing upwardly through the plate subassembly 16.

In addition, the chimneys 56 in conjunction with a number of relatively short downcomers 58 and circumferential dam 62 provide a constant head of liquid (denoted by liquid level 60) extending uniformly over the solid areas 51 of the suspending or distributing plate 46. The solid areas 51 of the suspending plates 46 and of the contact plates 40 extend uninterruptedly about the respective apertures 49. The apertures 49 of the contact plates 40 are provided with downwardly extending extensions or tubular extensions to promote intimate contact between the liquid and vapor phases.

The circumferential dam 62 minimizes the exposure of the inward gasket edges to the liquid phase, in the event that highly corrosive or penetrative liquids (such as ether) are encountered. Where it is not important to minimize liquid contact at the seal or gasket 30, the dam 62 can be omitted and the liquid level 60 can be maintained by the suspending ring 20 and gasket 30. For most applications the positive and uniform loadings applied to the gaskets 30 are more than adequate for the complete exclusion of any bypassing liquid leakage.

The downcomers 58 (whose tops are desirably at a uniform elevation) can be provided in the form of discrete tubular sections tightly or sealingly fitted in apertures therefor in the othewise solid areas 51 of the suspending plate 46. With this arrangement the liquid supplied to the suspending plate 46 is uniformly distributed to the solid plate areas 51 of the underlying intermediate plates 40 and is thereby uniformly distributed throughout each plate subassembly 16 (arrows 63) for maximum contact efficiencies.

The upper end portions of the downcomers or liquid-downcomers 58 are desirably slotted at 65 to different depths such that the notch bases are level to ensure substantially uniform ingress for the liquid in the event that the suspending plate 46 is not exactly horizontal or level. The width of the slots 65 is selected such that the liquid level will remain essentially at the tops of the downcomers 58 at normal feed rates, with liquids in the usual range of viscosities. For liquids in this range (e.g. up to 1 to 2 centipoises) one slotted tube 58 can be employed for every four chimneys 56. In the case of higher viscosities, additional downcomers 58 (such as illustrated in FIG. 2) can be utilized.

Figure 3:
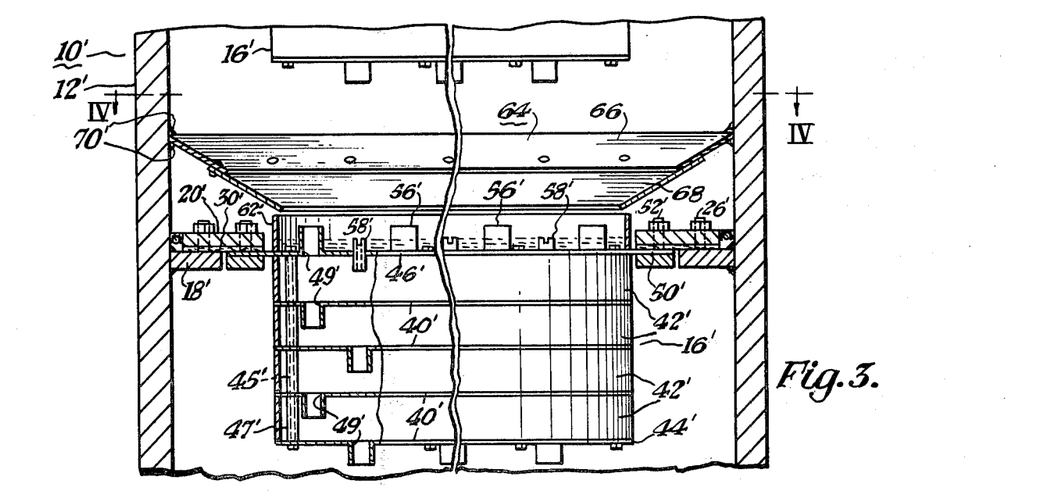
FIG. 3 is a partial, vertically sectioned view of another form of contact tower of the invention and showing modified forms of our novel plate subassembly and the supporting and sealing means therefor.
Figure 3A:
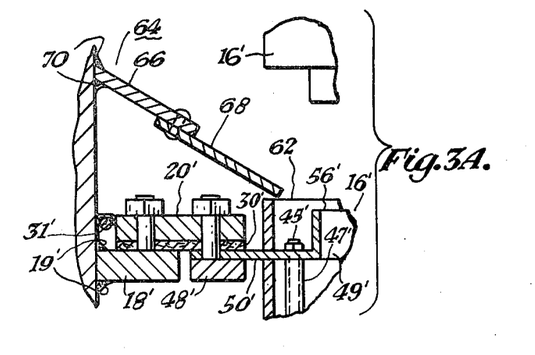
FIG. 3A is an enlarged view of a portion of the contact tower as shown in FIG. 3.

In FIGS. 3, 3A and 4 of the drawings, where similar reference numerals with primed accents denote similar components, a modified form of the top suspending plate 46' is employed in conjunction with other leakage and splash-deflecting means for the positive prevention of liquid reaching the gasekts 30'. The remaining structure of the plate subassemblies 16' and their supporting arrangements 18'–20' are essentially similar to the corresponding structures of FIG. 1 and will not be further described.

The suspending plate 46' includes the aforementioned peripheral dam or cylindrical dam 62' extending continuously about its overhanging edge portion 50'. The dam 62' is located inwardly of the suspending ring 20' but outwardly of the top plate apertures 49'. The peripheral dam 62' can be provided in sufficient height as to preclude virtually all splashing of the adjacent edge of the gasket 30'. Depending upon composition of a particular feed stock, liquid contact at the outer edge of the gasket 30' can be substantially prevented by use of an O-ring seal or packing described in conjunction with FIGS. 1, 1A and 2 of the drawings.

Alternatively and preferably, any liquid contact at the gasket 30' is positively prevented through use of a frustoconical baffle arrangement denoted generally by reference numeral 64 and located in the space between each adjacent pair of plate subassemblies 16. Each baffle 64 can be provided in a one-piece arrangement after the manner of FIG. 5, or as shown in FIGS. 3, 3A in the form of overlapping upper and lower frustoconical sections 66, 68. The upper or larger baffle section 66 can be permanently seal-welded at 70 to the adjacent wall surface of the shell 12 and can be left permanently in place, as it does not project inwardly of the associated supporting ring 18'. As in the case of the suspending rings 20', the lower baffles 68 can be provided in two or more sections to promote removability and can be detachably secured to the upper baffles 66 as by bolting or the like. The lower edge portion of each lower baffle 68 overhangs the adjacent plate dam 62' such that any splashing or wall leakage from the baffle arrangement 64 flows directly onto the top suspending plate 46′ or the adjacent subassembly 16′.

Another arrangement of our baffle and subassembly supporting and sealing arrangement is shown in FIG. 5 of the drawings. In the latter modification of our invention, the supporting and sealing means include a suspending ring 20″ provided with an upper, inwardly slanting surface 72 which cooperates with a relatively short frustoconical baffle 74 to deflect wall leakage and splashed liquid directly onto he top suspending plate 46″ of the plate subassembly 16″. If desired, a liquid deflecting O-ring 31′ and retaining ring 33′ can be employed, after the manner of FIG. 1. The subassembly 16″ otherwise can be constructed substantially as shown in FIG. 1. The liquid deflecting arrangement of FIG. 5, provides a more positive arrangement for deflecting both wall leakage and splash liquid directly onto the top plate 46″ of the associated plate subassembly 16″. The relatively short baffle 74 of FIG. 5 can be permanently installed, after the manner of FIGS. 3, 3A, if desired.

To facilitate installation and removal of each of the subassemblies 16, 16′ or 16″ the top plates thereof can be provided with lifting rings or hooks (not shown), or other suitable lifting means. If desired the suspending rings 20, 20′ or 20″ also can be provided with lifting means (not shown) for the same purpose.

Figure 6:
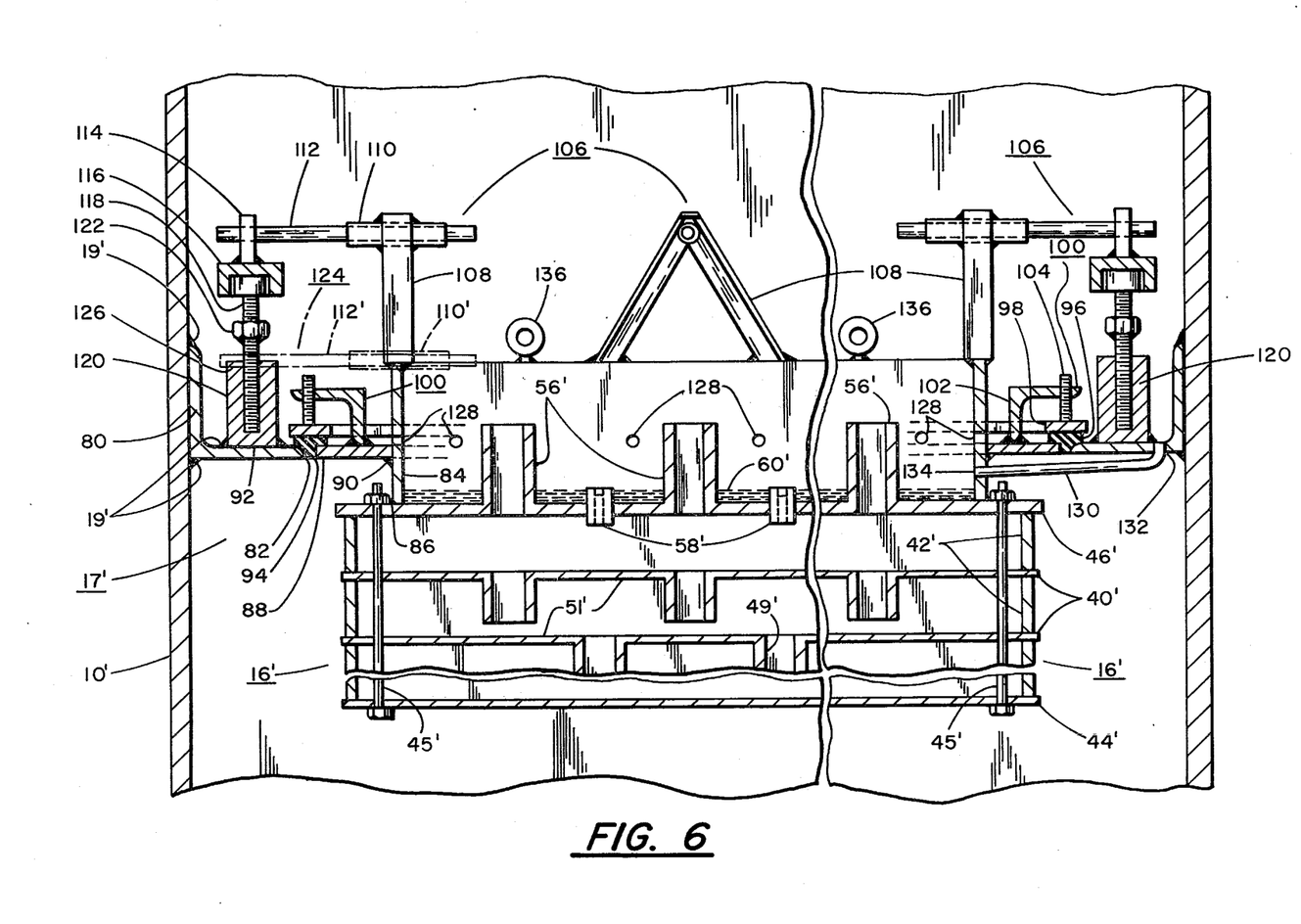
FIG. 6 is a partial, vertically sectioned view of still another form of contact tower of the invention and showing novel and modified forms of the plate subassembly and the supporting and sealing means therefor.

In FIG. 6 of the drawings where similar reference numerals with primed accents refer to similar components of the preceding figures, a modified supporting and sealing arrangement 17′ for a plate subassembly 16′ is disclosed. The supporting and sealing arrangement 17′ includes in this example a generally circular angle iron 80 or other supporting band secured at 19′ to the inside surface of the tower 10. In the event that the tower 10 is slightly out of round (as is usually the case), inward peripheral edge 82 of the angle iron 80 or other support can be trimmed to a circular configuration so that the support at least is round.

The uppermost or suspending plate 46′ of the subassembly 16′ is similarly provided with a peripheral dam 84, positioned in this example inwardly of the tie rods 45′. The dam 84 is structurally secured to the top plate 46′ as by welding at 86. In the modification of FIG. 6 the overhanging portions (50 or 50′ of preceding figures) of the top plate 46 or 46′ in the preceding modifications are eliminated, and an outwrdly extending sealing flange 88 is instead structurally secured to the dam 84, as by welding at 90. The flange 88 is positioned on the baffle 84 for alignment with horizontal flange 92 of the supporting ring 80, when the plate subassembly 16′ is properly positioned within the tower 10′, as described in greater detail presently.

The dam 84 and hence the plate subassembly 16′ is suspended from the associated supporting ring 80 by suitable means such as described below. When so supported, preferably with the dam flange 88 in alignment with the horizontal portion 92 of the supporting ring 80, means are provided for sealing the gap 94 therebetween in order positively to prevent the upward by-passage of vapor or the downward by-passage of liquid relative to the associated subassembly 16′. The peripheral gap 94 therefore is sealingly closed, in accordance with the invention, by means of O-ring 96 or similar band off gasketing material together with an overlying gasket loading ring 98. A circular array of clamping devices 100 can be mounted on the supporting ring 80 or on the sealing flange 88 for adjustably loading the ring 98 and gasket 96 to the requirements of a given application of the invention. In this example a number of the clamping devices 100 are located on the flange 88. The clamping devices 100 can take a variety of suitable forms, the illustrated one of which includes L shaped brackets 102 structurally secured to the sealing flange 88 and clamp members 104 threadedly engaged therewith for adjustable bearing engagement with the upper side of the compression split ring 98.

As intimated previously suspending means 106 are provided for suspending the dam 84 and subassembly 16′ from the associated supporting ring 80. Owing to the difficulties of aligning or leveling the sealing flange 88 of the dam 84 with the supporting ring 80, particularly in the larger towers having larger diameter plate subassemblies 16′, the suspending means 106 unexpectedly are endowed with an adjustment feature, according to another feature of the invention. Desirably at least three of the suspending means 106 are utilized for proper support and leveling of the plate subassembly 16′ and its flanged dam 84.

One arrangement of the suspending means 106 includes an upstanding bracket 108 structurally secured to the upper edge of the peripheral dam 84 and furnished with a horizontally extending sleeve 110. A supporting rod 112 is extended through the sleeve 110 and also through supporting ring 114 of cap 116. The cap 116 is supported on the upper end of a threaded rod or jack screw 118 which adjustably and threadedly engages pedestal 120 mounted on supporting ring 80. Desirably the threaded rod 118 is provided with an adjustment nut 122 or other member having a wrench configuration, which is welded or otherwise rigidly secured to the threaded rod 118. The rod 118 can be rotated in either direction for the purpose of aligning or leveling the adjacent portions of the flange 88 with the horizontal portion 92 of the supporting ring 80. By similarly manipulating the three or more suspending means 106 positioned about the periphery of the dam 84, the flange 88 can be peripherally aligned with the supporting ring 80. For leveling purposes, a certain amount of misalignment of the flange 88 and supporting ring 80 can be accommodated by the resiliency of gasket 96. In the event that such alignment of leveling does not place the subassembly 16′ in true horizontal position, any unevenness in depth of the liquid 60′ on top plate 46′ is compensated by the notched downcomers 58′, as explained previously.

Proper alignment of the flange 88 with the supporting ring 80 of course facilitates seating of the gasket 96 at the gap 94. In those applications where such alignment can be handled otherwise or where such seating of the gasket 96 or leveling of the subassembly 16′ is not nearly as critical, the adjustable suspending means 106 can be omitted, and optional suspending means 124 or the like, shown in chain outline in FIG. 6 can be substituted. In the latter arrangement of the suspending means 124, supporting rod 112′ is inserted into sleeve 110′ which is welded or otherwise structurally secured to the dam 84, desirably at the upper edge thereof. The supporting rod 112′ then rests in groove 126 provided optionally in the associated pedestal 120. A limited adjustbility can be provided for the optional suspending means 124 by inserting one or more shims (not shown) between the supporting rod 112′ and the bottom of the pedestal groove 126.

It will be understood that the frustoconical baffle 64 of FIG. 3, or the like, can be provided in conjunction with the dam 84, in order to prevent the accumulation of liquid on the supporting ring 80 or on the flange 88. Where the use of such baffle is not practical or desirable, or in conjunction therewith, one or more drain openings 128 can be provided in the dam 84 at the junction between the flange 88 and the dam 84. This will prevent the accumulation of liquid between the gasket 96 and the adjacent wall surfaces of the dam 84. For draining any liquid that may accumulate on the outward side of the gasket 96, i.e. between the gasket 96 and the tower wall, one or more drain conduits 130 can be supplied in communication with suitable apertures 132, 134 therefore in the supporting ring 80 and dam 84 respectively.

Desirably the dam 84 is provided with at least three lifting hooks 136 (alternatively with lifting apertures, not shown) so that the entire plate subassembly can be temporarily supported by a crane or the like in a position more or less of alignment with the supporting ring 80. Rods 112 can then be slipped through sleeves 110 and rings 114 to hold the subassembly 16 or 16' in place, whereupon final levelling movements can be effected by manipulation of the threaded rods or screws. 118.

Figures 7, 7A, 8, 8A:
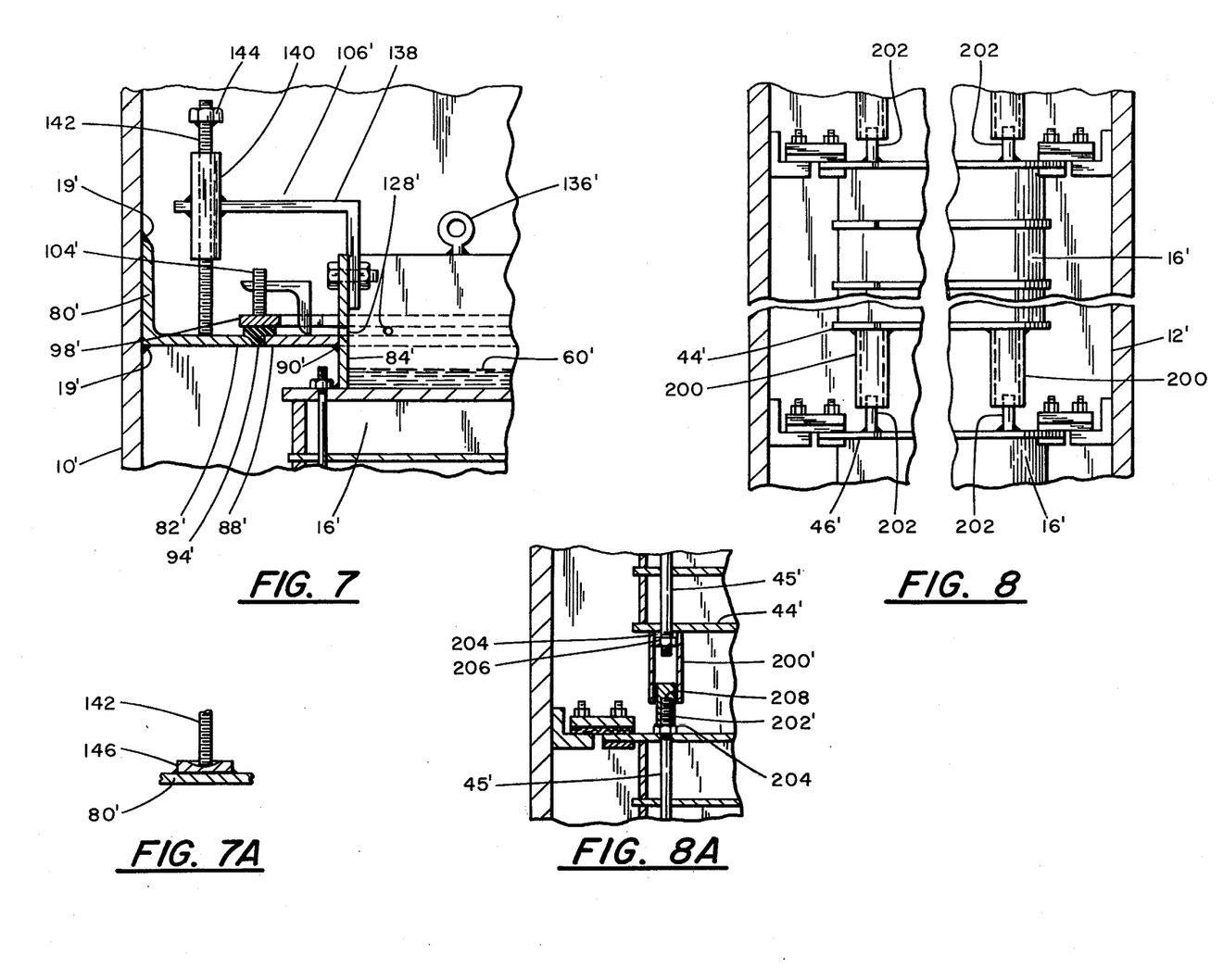

A further modification of the plate subassembly supporting arrangement is shown in FIG. 7, where similar reference numberals with primed accents denote similar components. Each supporting means 106' includes in this example an L-shaped bracket 138 or the like bolted or otherwise removably secured to the dam 84'. An elongated nut 140 or other internally threaded member is secured to the outer, otherwise free end of the bracket 138. A jack screw 142 or the like is threaded through the nut 140 and is desirably provided with a wrench configuration at 144.

In the operating position of the plate subassembly 16', the lower end of the jack screw 142 bears against supporting ring 80'. The jack screw 142 is manipulated until the flange 88' of the subassembly 16' is properly aligned with the supporting ring 80'. Preferably at least three of the adjustable suspending arrangements 106' are utilized, and desirable are equally spaced about dam 84'.

As shown in FIG. 7A, lateral alignment of the sealing flange 88' with the supporting ring 80' can be facilitated by means of a number of coasters 146 welded or otherwise secured to the supporting ring 80' at respective locations of intended contact of the jack screws 142 with the supporting ring 80'. Desirably each of the coasters 146 is dished to determine the contact point of the associated jack screw 142.

In FIG. 8 of the drawings, an arrangement is disclosed for laterally stabilizing the plate subassemblies of any of the preceding figures during shipment of contact towers utilizing the aforementioned plate subassemblies. In transit, contact towers customarily are shipped in a horizontal position. In accordance with the invention means are provided to stabilize the individual plate subassemblies against any tendency for lateral displacement within the contact tower. The stabilizing means are particularly advantageous for use with the plate subassemblies when suspended in the manner illustrated.

One arrangement for thus stabilizing a suspended plate subassembly, such as the subassemblies 16' within a contact tower 12' (FIG. 8), includes a number of sleeves 200 and interfitting studs 202. The sleeves 200 are welded or otherwise secured to a bottom plate 44' of a given subassembly 16' and extend axially and downwardly therefrom in the vertical, operating position of the tower 12'. The studs 202, on the other hand, are welded or otherwise secured to the uppermost plate 46'of the next lower subassembly 16' and extend upwardly and axially of the last mentioned plate subassembly in the operating position thereof. The studs 202 are relatively closely interfitted within the sleeves 200 when the plate subassemblies 16' are properly installed within the contact tower 12'. Thus, the interfitting studs 202 and sleeves 200 of juxtaposed plate subassemblies 16' obviate any tendency of the suspended plate subassemblies to lateal displacement, particularly when the tower 16' is shifted to a horizontal position for shipment.

An alternative arrangement for securing the sleeves 200' and studs 202' to the plate subassemblies 16' is disclosed in FIG. 8A. In the latter arrangement, tie rods 45' employed for securing the subassemblies 16' have their threaded end portions protruded beyond their securance nuts 204. Each of the sleeves 200' is provided with a recessed nut 206, or equivalent threaded member, secured therewithin whereby the sleeve 200' is threaded to the protruding end of the associated tie rod 45'. Desirably the threaded members 206 are recessed sufficiently to permit the upper ends of the sleeves 200' to fit flushly against the bottom surface of the lowermost plate 44'.

The studs 202' are each provided with a tapered aperture 208 whereby the studs are similarly and threadedly engaged with protruding upper end portions of the associated tie rods 45' of the adjacent subassembly 16'.

The advantages of the FIG. 8A modification are twofold. By thus engaging the tie rods of the individual plate subassembly 16', the sleeves 200' and the studs 202' are automatically pre-positioned for proper interfitting engagement. Further, the sleeves 200' and 202' serve as lock nuts for the tie rod securance nuts 204.

If desired, the tie rod securance nuts can be omitted at the sleeves 200/200' and the studs 202/202'. In the plate subassemblies 16' of FIGS. 8, 8A it will be understood, of course, that the positions of the sleeves 200 or 200' and of the studs 202 or 202' can be interchanged. That is to say the sleeves 200 or 200' can be secured to the topmost plate, and the studs 202 or 202' can be secured to the bottommost plate of an adjacent plate subassembly.

From the foregoing it will be seen that novel and efficient Contact Towers With Leak-Proof Support of Improved Plate Subassembly hve been disclosed and described. The descriptive and illustrative materials employed herein are utilized for purposes of examplifying the invention and not in limitation thereof. Accordingly, numerous modifications of the invention will occur to those skilled in the art without departing from the spirit and cope of the invention. Moreover, it is to be understood that certain features of the invention can be used to advantage without a corresponding use of other features thereof.

We claim:

1. In a gas-liquid contact tower the combination comprising a tower shell, a plurality of superimposed generally horizontal contact plates mounted in vertically spaced relation within said tower shell, said plates being grouped into at least one subassembly thereof, supporting and sealing means for removably supporting said plate subassembly within said tower shell and for preventing any of said contact liquid from bypassing said plate subassembly, said supporting and sealing means including a first annular component permanently secured and sealed to adjacent inner surfaces of said tower shell and a second annular component circumferentially joined to said plate subassembly and means movably mounting said second component to said first component to enable leveling thereof and gasketing means for preventing passage of fluid between said components, said gasketing means being inserted generally between said components.

2. The combination according to claim 1 including an upstanding dam secured to a top plate of said subassembly, said second annular component being circumferentially joined to said dam and extending outwardly therefrom.

3. The combination according to claim 2 wherein said supporting and sealing means further include suspending means mounted on said dam and bearingly engaging said first component for suspending said subassembly therefrom.

4. The combination according to claim 3 wherein said suspending means each include a supporting rod secured to said dam and extending generally outwardly toward said first component, each of said supporting rods supportedly engaging adjustment screws adjustably and threadably mounted on said first component.

5. The combination according to claim 4 wherein said supporting rods are respectively inserted in sleeves therefor, said sleeves being secured to a top edge of said dam.

6. The combination according to claim 3 wherein each of said suspending means include a supporting rod secured to said dam and extending generally outwardly toward and bearingly engaging said first component.

7. The combination according to claim 6 wherein said supporting rods are respectively inserted in sleeves therefor, said sleeves being secured to a top edge of said dam.

8. The combination according to claim 3 wherein said suspending means include a number of supporting arms mounted on said dam and extending generally outwardly toward said first component, and a jack screw and threaded member for each of said arms mounted on one of said first component and supporting associated of said arms.

9. The combination according to claim 8 including each of said arms having L-shaped configuration detachably joined to said dam and having the threaded member of the associated jack screw permanently joined thereto adjacent an outward end thereof.

10. The combination according to claim 9 including a centering coaster member for each of said jack screws secured to said first component adjacent the point of bearing engagement with said associated jack screw.

11. The combination according to claim 1 including a compression ring overlying said gasketing means and a number of clamp members mounted on one of said components for urging said compression ring into bearing engagement with said gasketing means.

12. The combination accordiing to claim 1 wherein said supporting and sealing means include a number of suspending means mounted on said plate subassembly and having a number of outwardly extending supporting rod members bearingly engaging said first annular component.

13. The combination according to claim 12 wherein said outwardly extending members bearingly and respectively engage jack screws mounted on said first component for aligning or leveling purposes.

14. The combination according to. claim 1 wherein said plates are grouped into a plurality of vertically spaced subassemblies, and supporting and sealing means are provided for each of said subassemblies, and including interfitting sleeves and studs secured respectively to confronting plates of adjacent plate subassemblies for laterally stabilizing at least one of said adjacent plate subassemblies.

* * * * *